(12) United States Patent
Kapadia et al.

(10) Patent No.: US 6,606,035 B2
(45) Date of Patent: Aug. 12, 2003

(54) SYSTEM AND METHOD FOR AIRPORT RUNWAY MONITORING

(75) Inventors: Viraf Kapadia, Mississauga (CA); Hilary Vieira, Mississauga (CA)

(73) Assignee: Safe Landing Systems Inc., Ontario (CA)

( * ) Notice: Subject to any disclaimer, the term of this patent is extended or adjusted under 35 U.S.C. 154(b) by 0 days.

(21) Appl. No.: 09/988,422

(22) Filed: Nov. 19, 2001

(65) Prior Publication Data
US 2002/0093433 A1 Jul. 18, 2002

Related U.S. Application Data
(60) Provisional application No. 60/249,251, filed on Nov. 17, 2000.

(51) Int. Cl.⁷ .............................................. G01C 21/00
(52) U.S. Cl. .................. 340/972; 340/933; 340/937; 340/961; 340/983; 348/143; 701/120; 701/301
(58) Field of Search ................................. 340/972, 971, 340/982, 983, 961, 933, 937; 348/123, 143; 701/120, 301

(56) References Cited

U.S. PATENT DOCUMENTS

| | | | |
|---|---|---|---|
| 3,872,474 A | * 3/1975 | Levine | 342/176 |
| 4,481,516 A | * 11/1984 | Michelotti | 340/552 |
| 5,375,058 A | * 12/1994 | Bass | 364/439 |
| 5,629,691 A | * 5/1997 | Jain | 340/933 |
| 5,719,567 A | * 2/1998 | Norris | 250/372 |
| 6,044,322 A | * 3/2000 | Stieler | 701/120 |
| 6,181,261 B1 | * 1/2001 | Miles, Jr. et al. | 340/933 |

* cited by examiner

Primary Examiner—Daniel J. Wu
Assistant Examiner—Son Tang
(74) Attorney, Agent, or Firm—Pillsbury Winthrop LLP

(57) ABSTRACT

A system and method are configured to provide a cost-effective runway monitoring tool that may be used by airports to aid in accident avoidance and investigation by generating and analyzing image data corresponding to runway areas and surfaces.

31 Claims, 1 Drawing Sheet

SYSTEM AND METHOD FOR AIRPORT RUNWAY MONITORING

The present application claims priority to U.S. provisional application of Kapadia, Ser. No. 60/249,251, filed Nov. 17, 2000, the entirety of which is hereby incorporated into the present application by reference.

1. Field of the Invention

The invention relates to systems and methods for monitoring and analyzing airport runway area conditions.

2. Background of the Invention

Presently, in the case of an aircraft runway accident, there is no video (other than occasional amateur video recordings) or other real time visual data capture method that may be used to aid in determining the cause of the accident. Moreover, there are currently no automated systems that analyze runway conditions and provide visual information to the ground/tower controller or the flight crew. This information provided at a critical time could potentially save hundreds of lives.

Airport authorities are under tremendous pressure to ensure that their runways are safe and that they are utilized to their maximum potential. Nevertheless, runway related accidents, e.g., due to airport runway congestion and Foreign Object Debris (FOD), such as the Air France Concorde accident that claimed 118 lives, are more likely to occur with more runways and aircraft on runways. Additionally, with more congestion on runways it is increasingly difficult for ground controllers to ensure that pilots and other flight crew understand and obey taxiing and "hold short" instructions and prevent accidents such as the recent Singapore Airlines incident where the pilot used the wrong runway.

In a study of 1,039 air accidents taken from the Aviation Accident Database between 1997 and 1999, 7.5% were identified as the result of on ground collision with object, 10% were due to collision between aircraft (other than midair) and 5% were wheels up landings. According to this data, potentially 22.5% of 121 commercial aircraft accidents could have been avoided based on runway conditions and taxiway activity.

SUMMARY OF THE INVENTION

Therefore, the systems and methods designed in accordance with at least one embodiment of the invention provide real-time image data transmission and processing capabilities. Additionally, exemplary embodiments of the invention allow for storage of data produced from this transmission and processing on a long-term basis for archival and/or investigation purposes.

DETAILED DESCRIPTION OF THE EMBODIMENTS

Figure 1:
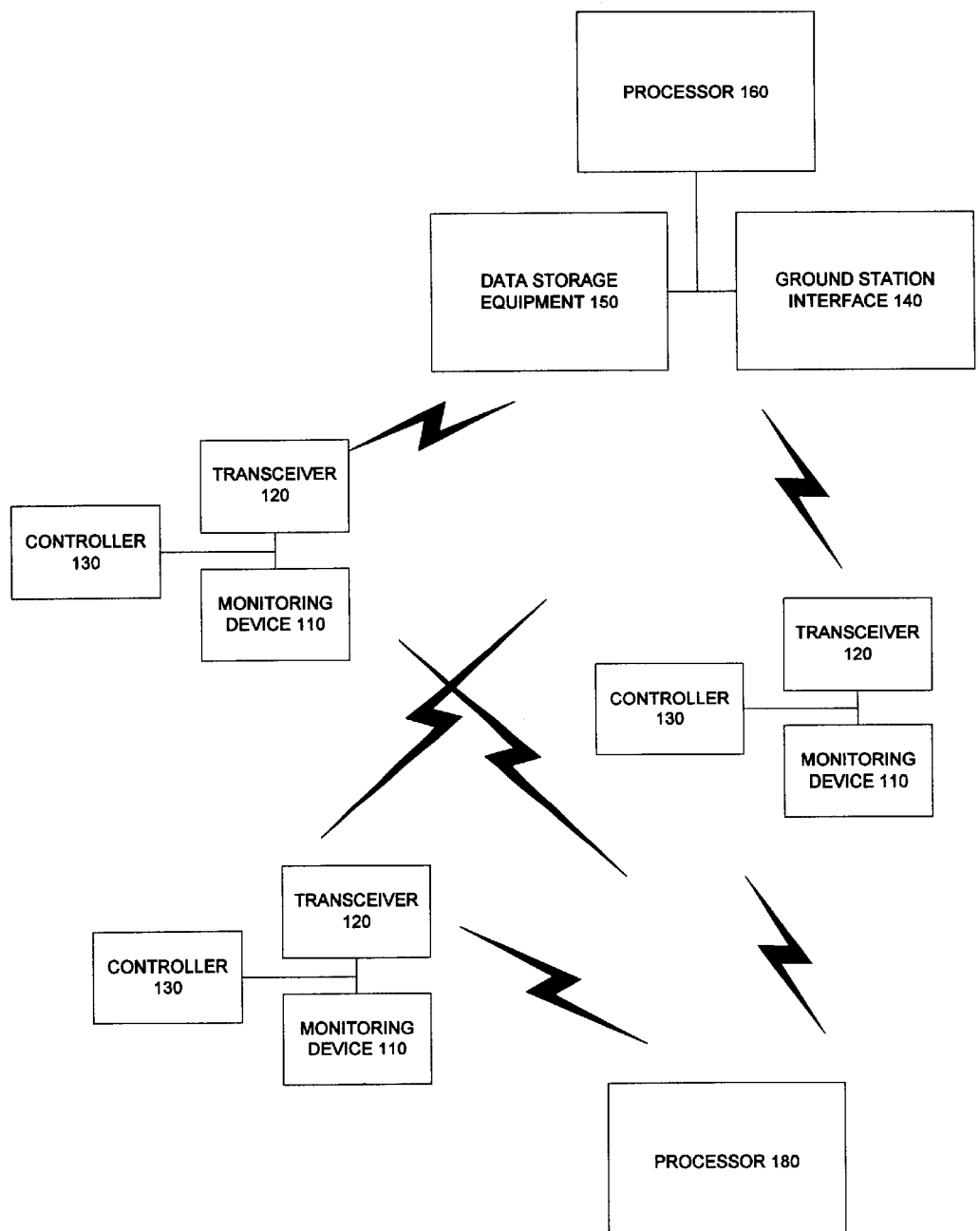
FIG. 1 illustrates a system for monitoring airport runways designed in accordance with the exemplary embodiments of the invention.

The embodiments of the invention are based in part on a recognition that video or other image data indicating runway activity and/or condition just prior to a runway accident would provide invaluable information to tower/ground controllers, flight crews and maintenance personnel to avoid accidents and to accident investigators and airport authorities to investigate accidents.

At least one embodiment of the invention provides a system and method that may alert aircraft operations, ground/tower controllers, and/or flight crews of potentially hazardous FOD and/or congestion on an active runway as well as runway conditions. At least one embodiment of the invention provides a system and method that are configured to provide real-time diagnosis of various elements of runway condition, thereby improving capabilities for aircraft safety during landing or taking-off. At least one embodiment of the invention provides a system and method that monitor and record runway activity, which may be of particular utility to avoid or to investigate runway accidents. At least one embodiment of the invention provides a method and system for monitoring approaching or departing aircraft locations and/or potential locations. This monitoring may be supplemental to the activities of aircraft controllers. At least one embodiment of the invention provides a method and system for monitoring taxiways particularly "hold short" positions at a runway threshold.

Video system and digital data transmission technology have advanced enormously in recent years and both the technology and processing capabilities have now progressed to the point where a reliable system can be economically installed at any airport. Additionally, software has advanced to the point that users can be provided with economic, commercial packages that are autonomous in operation, user friendly, flexible and reliable.

Systems and methods designed in accordance with at least one embodiment of the invention may have beneficial utility in that they may provide mechanisms for accident avoidance and investigation. Additionally, systems and methods designed in accordance with at least one embodiment may enable airport operators implementing such systems and methods to customize monitoring by selecting specific areas to be monitored (e.g., runway only monitoring, taxiway monitoring, approach and takeoff monitoring). Data storage capacities and additional data analysis tools such as traffic data can also be customized. This provides operators with cost savings options and allows them to add system options at a time later than system installation.

Moreover, the systems and method designed in accordance with at least one embodiment of the invention allow for the use of existing runway lighting and power infrastructure, thereby reducing installation costs and allowing installation to be completed without closing runways for extended periods of time.

Furthermore, coordinating technology included in such systems and methods with existing technology may help ensure large-scale acceptance by passenger and pilot associations as well as a speedy and easy implementation process. As one result of this ease and speed of implementation, the technology utilized by the sitemaps and methods designed in accordance with invention embodiments may be quickly recognized by the insurance industry as a tool for ultimately reducing their payout risk. Accordingly, transport operators and carriers may be able to realize lower insurance premiums as a result of implementation. Additionally, training requirements for operators interacting with and operating the methods and systems designed in accordance with the exemplary embodiments of the invention, e.g., ground/tower controllers, pilots and airport maintenance personnel, may be minimal.

The systems and methods designed in accordance with at least one embodiment of the invention may utilize standard or customized computer implemented or controlled, detectors and transceiver equipment to monitor airport runways and taxiways. Data feeds associated with or coupled to the detectors may be available to aircraft via a radio or satellite feed. Therefore, for example, image data may be available to pilots and flight personnel. The data resulting from monitoring may be analyzed to provide FOD and/or aircraft incursion alerts to ground/tower controllers and flight crews, as well as store the data, e.g., at the ground station, for archival purposes.

Active runway surfaces may be scanned by monitoring devices such as video, single-frame, infrared of and/or high definition cameras, Light Detection and Ranging (LIDAR), etc. It should be understood that monitoring devices, e.g., cameras may be located at different locations and at different allowed elevations along a runaway area to ensure coverage of the entire runaway area. Moreover, the monitoring devices may be used to monitor each other by ensuring the view of one covers another monitoring device.

LIDAR is similar to the more familiar radar, and can be thought of as a laser radar. In a radar, radio waves are transmitted into the atmosphere, which scatters some of the power back to the radar's receiver. LIDAR also transmits and receives electromagnetic radiation, but at a higher frequency. LIDAR operates in the ultraviolet, visible and infrared region of the electromagnetic spectrum. Different types of physical processes in the atmosphere are related to different types of light scattering. Choosing different types of scattering processes allows atmospheric composition, temperature and wind to be measured. Simplified hardware associated with or included in a LIDAR device includes a transmitter, receiver and detector system. The transmitter may be, for example, a laser, while its receiver may be an optical telescope.

The infrared sensors may be used to detect discontinuities in runway area temperature indicating, for example, ice, snow, fire, etc. Software may be used to monitor the camera images along with the data from the infrared and LIDAR to reduce false alarms due to ice, snow and rain.

The image data resulting from the monitoring devices may be compared to baseline image data stored in the database. This baseline image data may be indicative of active runway surfaces that have been predetermined to be sufficient, acceptable, or of a specific sufficiency level, e.g., ideal, near ideal, sufficient, marginal, unacceptable, etc. Based on this comparison, discrepancies such as the presence of FOD may be reported to, for example, a ground/tower controller or a pilot (depending on system specifications) and airport maintenance personnel may be alerted to, for example, remove FOD from the runway surface at a specified location. These operations may be performed on a customized schedule to ensure that departing and landing aircraft have a FOD free runway surface. Alternatively, or in addition, scanning may be initiated at the request of, for example, ground/tower controllers, pilots or airport maintenance personnel.

Systems and methods designed in accordance with the exemplary embodiments of the invention may also be customizable to provide real-time, aircraft incursion prevention information to the ground/tower controllers and takeoff or landing sequences for video review during accident investigations.

As illustrated in FIG. 1, the system 100 includes at least one remote monitoring device 110 that may be a single-exposure or video camera that is capable of generating image data indicative of a runway area and/or surface, a LIDAR device, or some combination of these devices. It may be advantageous to include a plurality of remote monitoring device(s) 110 to provide additional image data, for example, to provide additional views of an area and/or surface.

The monitoring device(s) 110 may provide high definition image data. The monitoring device(s) 110 may generate infrared imagery data.

The remote monitoring device(s) 110 may be coupled to a transceiver 120 that may be configured to transmit image data generated by the remote monitoring device(s) to, for example ground/tower controllers. When more than one monitoring device 110 is implemented, additional transceivers 120 may be included, for example, one transceiver 120 for each monitoring device 110. The transceiver 120 may also be configured to receive instruction data from, for example, ground/tower controllers so as to allow such controllers to initiate scanning of an area or surface.

The monitoring device(s) 110 and transceiver(s) 120 may also be coupled to a remote controller 130 that is configured to control operation and cooperation of the monitoring device(s) 110 and the transceiver(s) 120. It is foreseeable that the controller 130 may be incorporated within either the monitoring device 110 or the transceiver 120. Additionally, it is foreseeable that the monitoring device 110, transceiver 120 and controller 130 may be incorporated in a single unit.

The system 100 also includes a ground station interface 140 that may be implemented as, for example, a PC workstation with, for example, a Windows(™) operating system, data processing software, and/or video processing capabilities. This ground station interface 140 may be coupled to data storage equipment 150, which may be used for storing software utilized by the system 100 to perform data transmission between the transceivers 120 and the ground station interface 140, baseline image data, image data produced during operation of the system and comparison results produced by comparison of the image data and baseline image data. The ground station interface 140 may be configured to produce an alert so as to indicate circumstances that require the attention of ground/tower controllers or other personnel.

The ground station interface 140 and the data storage equipment 150 are coupled to at least one processor 160 that performs image data analysis and management to determine whether circumstances require the attention of ground/tower controllers or other personnel and/or to store image data produced during operation of the system 100 and comparison results produced by comparison of the image data and baseline image data. When such circumstances exist the processor(s) 160 may output an alert via the ground station interface 140.

The system 100 also includes at least one aircraft interface 160 that may be implemented as, for example, a PC workstation with, for example, a Windows(™) operating system, data processing software, and/or video processing capabilities. This aircraft interface 140 may be coupled to data storage equipment 170, which may be used for storing software utilized by the system 100 to perform analysis of image data available using the system 100 similarly to the ground station interface 140. The aircraft interface 170 may be configured to produce an alert so as to indicate circumstances that require the attention of aircraft crew personnel.

The at least one aircraft interface 160 is coupled to at least one processor 180 that performs image data analysis and management to determine whether circumstances require the attention of the aircraft crew personnel. When such circumstances exist the processor(s) 180 may output an alert via the aircraft interface 160.

The monitoring device 110, transceiver 120 and controller 130 may be powered either from a local runway lighting source, or independently, using a dedicated power source, for example, one providing minimum battery power (e.g., a solar charged battery configuration).

According to one exemplary embodiment of the invention, the monitoring device(s) 110, transceiver(s) 120 and controller(s) 130 may operate on an automated basis, i.e., generating and transmitting image data periodically or continuously to the ground station interface 140. As a result, the monitoring device(s) 110, transceiver(s) 120 and controller(s) 130 may require no ground/tower or aircraft crew monitoring performed by personnel except when an alert is announced by the ground station interface 140 or the aircraft interface 160 based on operations performed by the processor(s) 160 and 180, respectively. The alert can be customized as an aural and/or visual cue and may be directed at ground/tower controllers, airport maintenance personnel or aircraft crews. Additionally, data indicating the sounding of an alert may be archived in the data storage equipment 150, for example, in pre-determined formats based on number of alerts and/or image data associated with the alert.

As a result of such an alert, ground/tower controllers and/or airport maintenance personnel may be alerted of the situation and can immediately contact the airport maintenance crew and/or flight crews with specific information on the proximity or location of the problem. If deviations, e.g., runway conditions including FOD or some other runway deficiency, are such that the processor determines that aircraft safety is questionable, the e-Commerce may issue an alert to the ground/tower controllers or to aircraft crews, e.g., by changing the color of runway lights, e.g., to red, flashing the runway lights at or near the location or proximity of the deviations, etc. Moreover, additional lights may be placed along the runaway area that may automatically turn a specific color, e.g., red, to warn approaching aircraft of situations at the runaway area.

As a result, departing or approaching aircraft may be alerted of potentially dangerous conditions either directly from the system 100 or via ground/tower controllers.

In the event of a runway accident, e.g., occurring during taxi, take-off or landing, crash, investigation can begin in a more immediate manner because image data associated with a location or proximity of the accident has been captured and stored in real-time and may be immediately or almost immediately accessible. As a result, dependency on amateur video footage of an accident may be minimized.

In accordance with an exemplary embodiment of the invention, image data provided by the monitoring device(s) 110 may be analyzed in real-time or near real-time by the processor(s) 160, 180 to identify any deviations from various conditions, e.g., ideal, near ideal, sufficient, marginal, unacceptable, etc., which may be associated with baseline image data. The image data provided by the monitoring device(s) 110 may be analyzed in real-time or near real-time by the processor(s) to identify deviations that may warrant action by airport maintenance personnel, e.g., FOD on the runway surface to be removed. The image data may also be analyzed during aircraft accident investigations.

Additionally, the system and method may be used to monitor runway intersections and taxiways to reduce ground collisions between aircraft or other airport vehicles. Therefore, it should be understood that the processor(s) 160, 180 may include software that enables analysis of image data to identify particular vehicles, i.e., aircraft and other airport vehicles, on a portion of runway, a number of vehicles on a runway, and a geographical relationship between those vehicles. Additionally, the processor(s) 160, 180 may include software that enables a determination whether too many vehicles are in a particular area, vehicles are too close one another, etc.

While this invention has been described in conjunction with the specific embodiments outlined above, it is evident that many alternatives, modifications and variations will be apparent to those skilled in the art. Accordingly, the embodiments of the invention, as set forth above, are intended to be illustrative, not limiting. Various changes may be made without departing from the spirit and scope of the invention.

For example, the system and method may be configured to gather and analyze data on the number of aircraft that land and take off, and other additional data that may be used by the governmental and regulatory authorities to plan and schedule flights. Runway area maintenance and design.

We claim:

1. A system for monitoring at least one runway area to produce runway condition data, the system comprising:

at least one monitoring device configured to monitor at least one runway area and generate image data pertaining to the at least one runway area;

at least one transceiver coupled to the at least one monitoring device and configured to receive image data from the at least one monitoring device; and at least one processor configured to communicate with the at least one transceiver to receive image data and generate data indicating at least one runway condition, wherein the at least one transceiver is configured to receive operation instruction data from the at least one processor and transmit image data to the at least one processor via at least one communication link, the at least one monitoring device is one of a plurality of monitoring devices and the at least one transceiver is one of a plurality of transceiver configured to receive operation instruction data from the at least one processor and transmit image data to the at least one processor via at least one communication link, the plurality of monitoring devices are located at individual locations to monitor each other by providing views that cover at least one other monitoring device, the at least one processor is configured to issue an alert in response to a determination that the at least one runway area includes at least one of potentially hazardous foreign object debris, vehicle congestion and hazardous runway conditions, and the alert changes the color of runway lights or flashes runway lights.

2. The system of claim 1, further comprising at least one interface coupled to the at least one processor and configured to output the data indicating at least one runway condition.

3. The system of claim 1, wherein analysis of image data is performed in real-time.

4. The system of claim 1, wherein the processor performs image data processing in real-time.

5. The system of claim 1, further comprising data storage equipment coupled to the processor and configured to store at least one of the transmitted image data and the data indicating the at least one runway area condition.

6. The system of claim 1, wherein the image data indicates at least one of runway area activity and runway area condition.

7. The system of claim 1, wherein the at least one runway area includes at least one of a runway, taxiway, approach airspace and takeoff airspace.

8. The system of claim 1, wherein the data indicating the at least one runway condition data is output to a data feed accessible by at least one vehicle.

9. The system of claim 1, wherein the data indicating at least one runway area condition is output to a groundstation.

10. The system of claim 1, wherein the at least one monitoring device includes at least one of a video camera, single-frame camera, infrared camera, high definition camera, Light Detection and Ranging device.

11. The system of claim 1, wherein the plurality of monitoring devices are located at individual locations and at different elevations along the at least one runaway area to provide coverage of the entirety of the at least one runaway area.

12. The system of claim 1, wherein the at least one monitoring device generates baseline image data associated with a first condition, generates other image data associated with at least a second condition and the at least one processor compares the image data associated with the conditions to determine whether foreign object debris is present in the at least one runway area.

13. The system of claim 1, wherein the at least one monitoring device generates baseline image data associated with a first condition, generates other image data associated with at least a second condition and the at least one processor compares the image data associated with the conditions to determine whether vehicle traffic congestion is within acceptable tolerances.

14. The system of claim 13, wherein the tolerances are predetermined and accessible by the at least one processor prior to generation of the image data associated with at least the second condition.

15. The system of claim 1, wherein the processor may issue instructions to generate an alert if the data indicating the at least one runway condition indicates an unacceptable runway area condition.

16. The system of claim 15, wherein the unacceptable runway condition may include at least one of, vehicle traffic congestion outside acceptable tolerances, presence of an unacceptable amount of ice, presence of fire, and presence of foreign object debris.

17. A method for monitoring at least one runway area to produce runway condition data based on the monitoring, the method comprising:

monitoring at least one runway area and generating image data pertaining to the at least one runway area using a plurality of monitoring devices each located at individual locations to monitor the at least one runway area and each other by providing views that cover at least one other monitoring device;

transmitting at least a portion of the image data to a processor;

analyzing the transmitted image data, via the processor, to generate data indicating at least one runway area condition;

issuing an alert in response to a determination that the at least one runway area includes at least one of potentially hazardous foreign object debris, vehicle congestion and hazardous runway conditions; and issuing instructions to generate an alert if the data indicating the at least one runway condition indicates an unacceptable runway area condition, wherein the alert changes the color of runway lights or flashes runway lights.

18. The method of claim 17, further comprising storing at least one of the transmitted image data and the at least one runway area condition in data storage equipment.

19. The method of claim 17, monitoring is performed in real-time.

20. The method of claim 17, analysis of image data is performed in real-time.

21. The method of claim 17, wherein the at least one runway area includes at least one of a runway, taxiway, approach airspace and takeoff airspace.

22. The method of claim 17, further comprising outputting the data indicating the at least one runway condition.

23. The method of claim 17, further comprising storing at least one of the transmitted image data and the data indicating the at least one runway area condition.

24. The method of claim 17, wherein the image data indicates at least one of runway area activity and runway area condition.

25. The method of claim 17, wherein the at least one runway area includes at least one of a runway, taxiway, approach airspace and takeoff airspace.

26. The method of claim 17, further comprising outputting the data indicating the at least one runway condition data to a data feed accessible by at least one vehicle.

27. The method of claim 17, further comprising outputting the data indicating the at least one runway area condition to a groundstation.

28. The method of claim 17, further comprising:

generating baseline image data associated with a first condition;

generating other image data associated with at least a second condition; and comparing the image data associated with the conditions to determine whether foreign object debris is present in the at least one runway area.

29. The method of claim 17, further comprising:

generating baseline image data associated with a first condition;

generating other image data associated with at least a second condition; and comparing the image data associated with the conditions to determine whether vehicle traffic congestion is within acceptable tolerances.

30. The method of claim 29, wherein the tolerances are predetermined prior to generation of the image data associated with at least the second condition.

31. The method of claim 17, wherein the unacceptable runway condition may include at least one of, vehicle traffic congestion outside acceptable tolerances, presence of an unacceptable amount of ice, presence of fire, and presence of foreign object debris.

* * * * *